W. UMBDENSTOCK.
MACHINE FOR CASTELLATING NUTS.
APPLICATION FILED SEPT. 20, 1919.
1,410,145.
Patented Mar. 21, 1922.
4 SHEETS—SHEET 1.
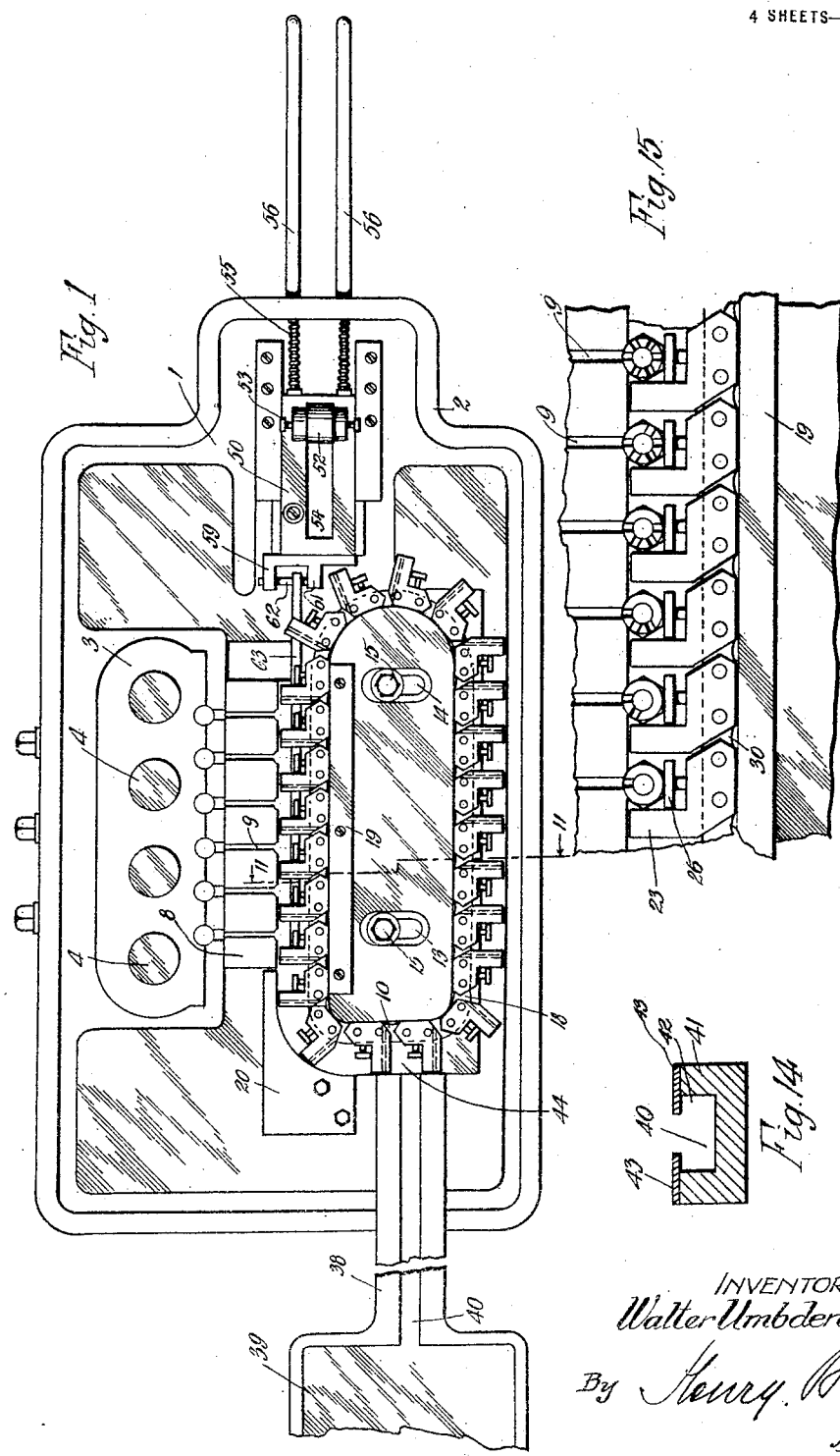
INVENTOR
Walter Umbdenstock
By Henry Blech
Attorney.

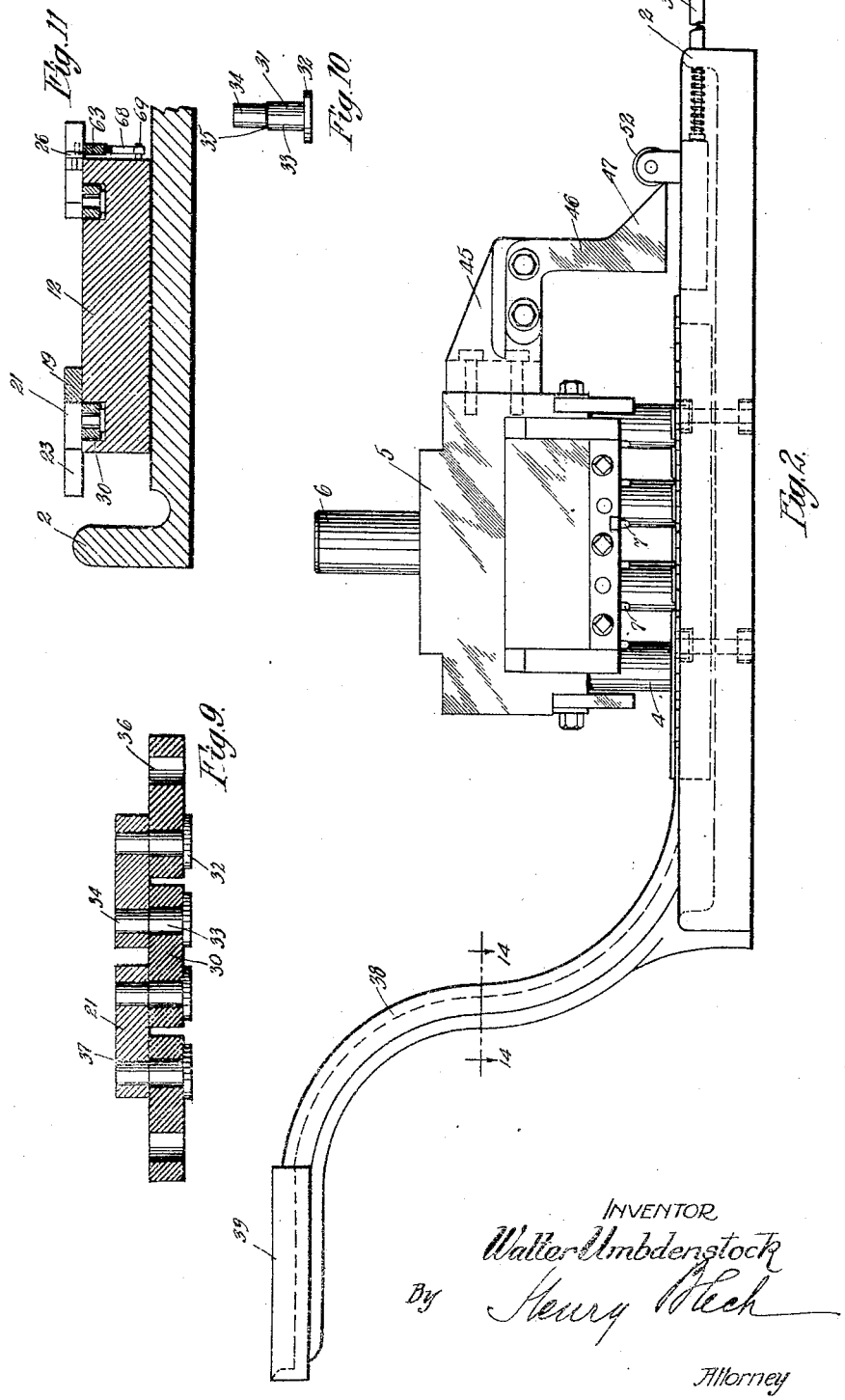

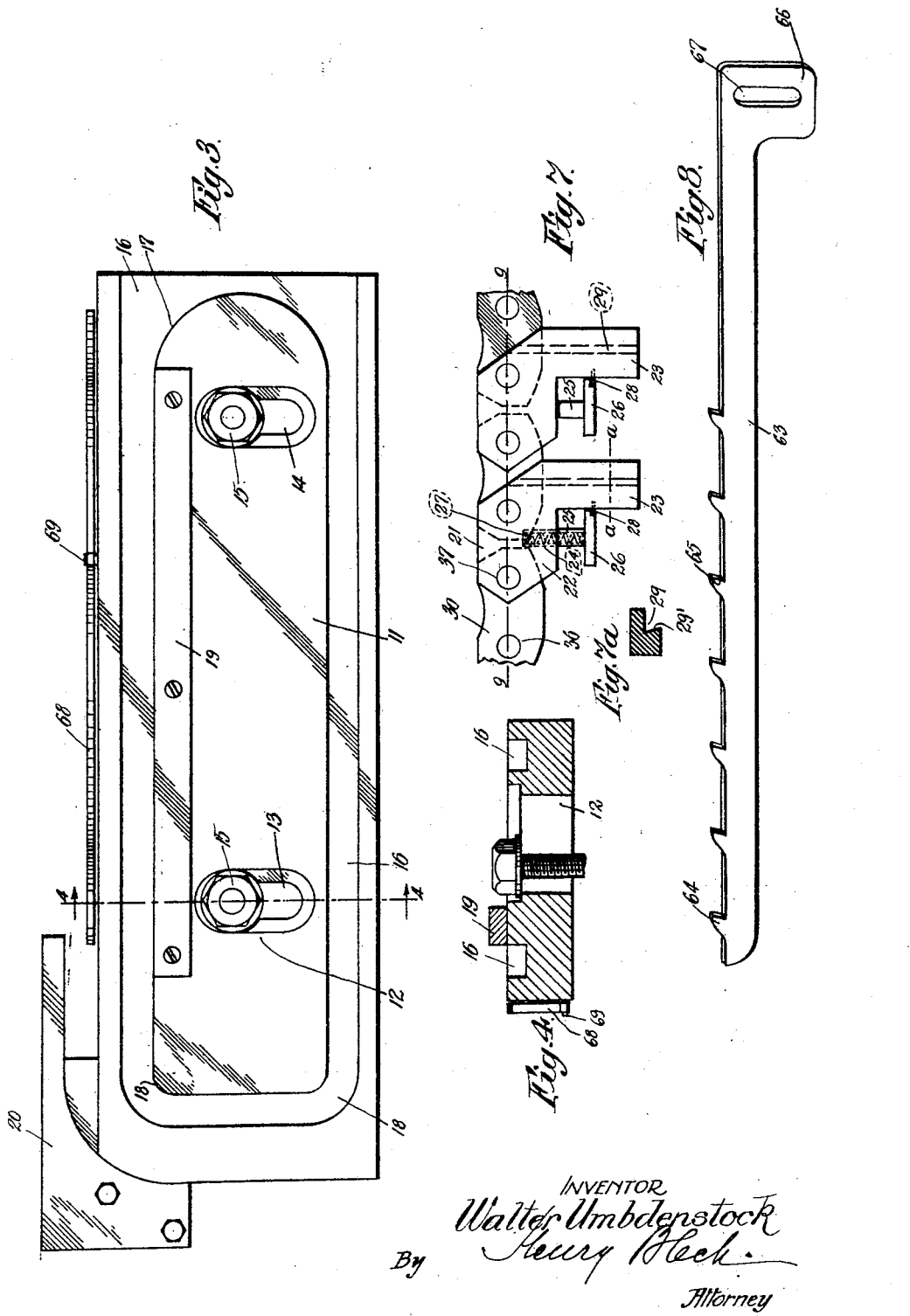

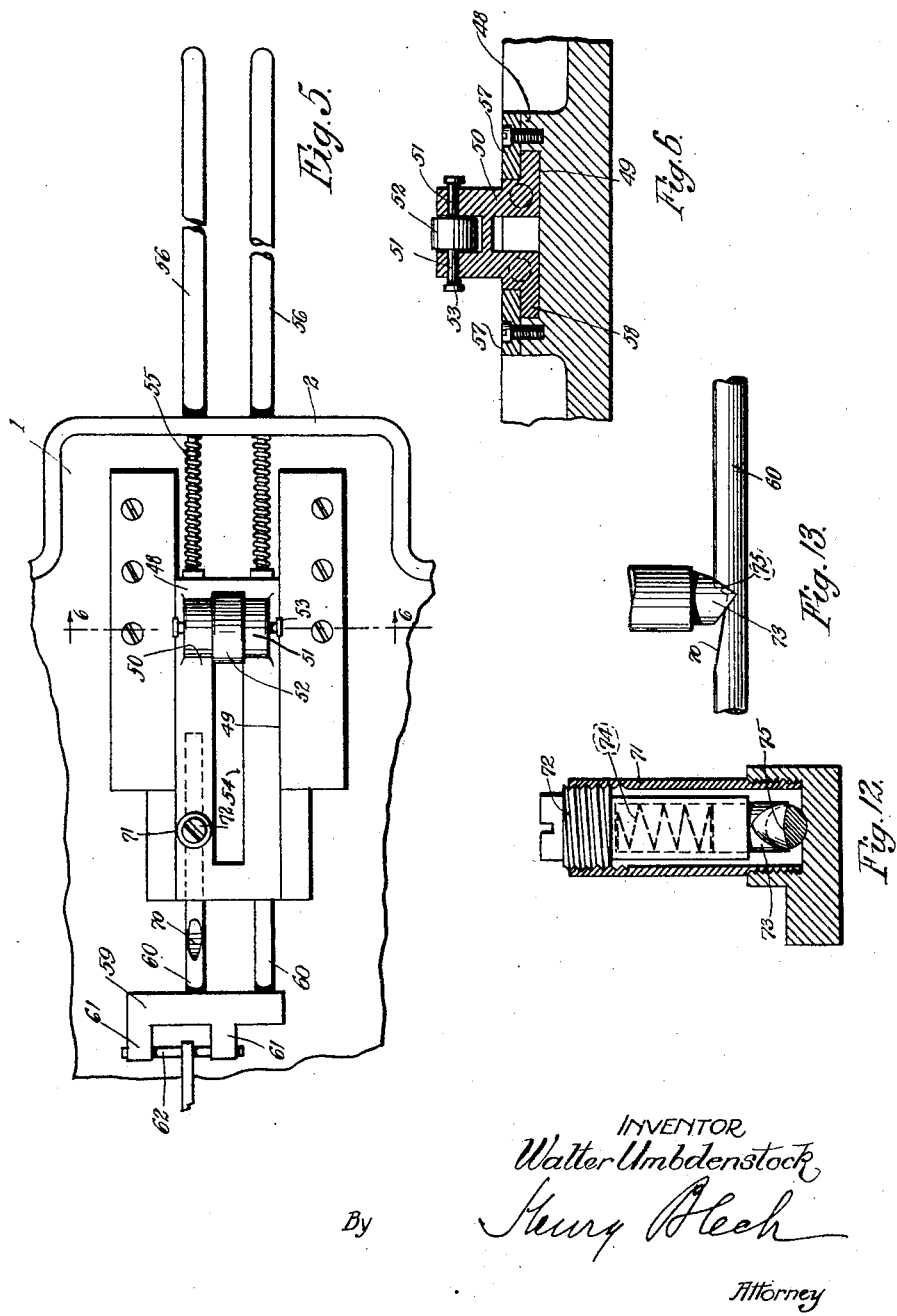

UNITED STATES PATENT OFFICE.

WALTER UMBDENSTOCK, OF CHICAGO, ILLINOIS, ASSIGNOR TO THE HILL PUMP VALVE COMPANY, OF CHICAGO, ILLINOIS.

MACHINE FOR CASTELLATING NUTS.

1,410,145.   Specification of Letters Patent.   Patented Mar. 21, 1922.

Application filed September 20, 1919. Serial No. 325,190.

*To all whom it may concern:*

Be it known that I, WALTER UMBDENSTOCK, a citizen of the United States, residing at 2307 Archer Avenue, Chicago, Illinois, care of The Hill Pump Valve Company, have invented certain new and useful Improvements in a Machine for Castellating Nuts, of which the following is a specification.

The invention relates to machines for castellating nuts, and is particularly concerned with the means for conveying nut blanks through such machines to be castellated.

The broad object of the invention constitutes the provision of a fool-proof feeding means whereby the nut blanks are accurately and reliably conveyed through a predetermined path for the purpose of being slotted from the center bore outwardly.

A further object aims at the provision of endless means for intermittently and continuously conveying the nut blanks through an assigned path.

A further object embraces the provision of such endless means for conveying nut blanks in upright position, i. e. with the longitudinal axis extending vertically.

A further object aims at the provision of an endless chain which with a stationary die defines a path through which the nut blanks are conveyed.

Another object aims at the construction of the chain to adapt the same for receiving a nut blank between each pair of links and for maintaining such blank in proper position throughout the effective travel of the chain, to permit proper castellation of the nut blanks.

A still further object involves the provision of resilient gripper or holding means permitting the nut blanks to execute movements independent of the movement of the chain.

It is also an object of the invention to provide positive means for guiding the chain throughout its travel so as to maintain the nut blanks in precise and accurate position necessary for the correct slotting thereof.

A further object constitutes the provision of automatic means for preventing operation of said conveying means upon improper arrangement of the nut blanks.

Another purpose constitutes the provision of certain features of construction, arrangement, and cooperation of parts whereby the requirements of a device of this character are fully met.

With these and other objects in view, which will hereinafter appear, the invention comprises the means hereinafter fully described and particularly pointed out in the claims. In the annexed drawings, Fig. 1 is a top plan view of a machine for castellating nuts, with the punch and punch holder removed, and equipped with the improved conveying means.

Fig. 2 is a front elevational view of the machine.

Fig. 3 is a top plan view of the bed plate provided for the conveying means and secured to the die shoe of the machine.

Fig. 4 is a section on the line 4—4 of Fig. 3.

Fig. 5 is a fragmentary top plan view of the right portion shown in Fig. 1 to disclose the instrumentalities for actuating the conveying means.

Fig. 6 is a section on the line 6—6 of Fig. 5.

Fig. 7 is a plan view of a portion of the chain constituting the feeding means for the nut blank.

Fig. 7a is a detail section on the line a—a of Fig. 7.

Fig. 8 is a perspective view of the actuating bar for transmitting an intermittent motion to the endless chain.

Fig. 9 is a section on line 9—9 of Fig. 7.

Fig. 10 is a detail view of a pin for securing the links of the feeding chain together.

Fig. 11 is a section on the line 11—11 of Fig. 1.

Fig. 12 is a sectional elevation of the safety device for the feeding.

Fig. 13 is a side elevation of parts of the safety device as normally positioned.

Fig. 14 is an enlarged section on the line 14—14 of Fig. 2, and

Fig. 15 is a fragmentary plan view to show the arrangement of the nut blanks in position to be operated on.

The machine for castellating nuts is of the type fully described in my copending application for Letters Patent, serially numbered 295,689, and filed May 8, 1919. This machine, in accordance with the description of said application, includes means for indexing nut blanks, and vertically reciprocating punches for slotting the nut blanks from the center bore outwardly in conjunction with stationary dies. But as these parts are without the scope of the present invention and as the present invention is merely concerned with the means for conveying nut blanks successively through a path assigned thereto, a description of irrelevant or ancillary subject matter is entirely omitted, or only such reference thereto is made as is inevitable for a proper understanding of the present invention.

Referring to the several views of the drawings, and particularly to Figs. 1 and 2, 1 designates a die shoe of oblong construction equipped with a vertical flange 2 which extends throughout the perimeter of the die shoe. At the central rear portion of the die shoe a block 3 is provided to which are secured a plurality of upright pins 4 constituting guide rods for a vertically reciprocating punch holder 5 equipped with a shank 6 and adapted to be secured to a ram or other reciprocating element of the punch press. The punch holder 5 is equipped with a plurality of punches 7 which coact with a plurality of stationary dies 8, so that upon a vertical reciprocation of the punch block the punches are adapted to enter the center bore of the nut blanks and to slot the wall of the nut blank from the center bore outwardly. The manner of guiding the punches so as to obtain such slotting operation is a matter with which my copending application is concerned, and this brief reference thereto will therefore suffice.

In order to obtain the proper feeding of the nut blanks and their proper arrangement relative to the dies 8, so that they are centrally located with spaced channels 9 provided for the discharge of the slugs cut out from the nut blanks, an endless chain generally denoted by 10 is provided which is adapted to travel in a horizontal plane and whose inner run together with the stationary dies 8 defines a path through which the nut blanks must be successively and intermittently conveyed in order to be operated on by the punches 7. As indicated in Fig. 2, six punches are provided and a like number of dies 8 are disposed, so that after the chain has executed six step by step movements, one nut will have been formed with six slots ready for discharge, and this is depicted in Fig. 15, where in the first position the nut blank shown has one slot, in the second position has two slots, and so on, until in the last position it has been formed with six slots and is then ready for discharge.

To the die shoe at a proper distance from the stationary dies 8 a bed 11 (Fig. 3) is secured adapted to receive the chain in such manner as to permit travel thereof. The bed comprises a plate 12 equipped with transverse elongated slots 13 and 14 through which screws 15 extend for the purpose of securing the bed 11 to the die shoe. The plate 12 is provided with a groove 16 forming a rectangle but having its corners rounded as at 18 and one side formed as a semicircle so as to permit the parts of the chain which extend into the groove to travel with a minimum amount of friction. To the bed plate 12 a bar 19 is secured to constitute an abutment for the chain members which are situated above the groove. As will be readily understood, the bar 19 is arranged at the inner side of the bed plate or at that side which is adjacent to the stationary dies and where it is of the highest importance that the nut blanks should be held in proper position to secure correct slotting thereof. The bed plate 12 at the left rear corner as viewed in Fig. 3 is equipped with a guiding flange 20 so as to ensure proper conveying of the nut blanks.

The chain which is adapted to travel in the groove of the bed plate 12 is depicted in Figs. 7, 9 and 11, and comprises a plurality of spaced links 21 which are made up of body portions 22 and are formed with integral outwardly projecting arms 23 which serve the function of carrying the nut blank by a step by step movement into successive positions. The body portion 22 at the outer side has a bore 24 to receive a hollow sleeve 25 of a disk 26. A spring 27 is interposed between the bottom of the bore 24 and the disk 26, and is arranged within the sleeve 25, so that the disk 26 is normally forced outwardly until arrested in such movement by a pin 28 which projects laterally from the carrier arm 23. As indicated in Fig. 7ª the carrier arm 23 is formed throughout its length at one side with an undercut groove 29 for a purpose hereinafter further referred to.

The links 21 of the chain are arranged in spaced relation and are interconnected by the members 30 whose longitudinal edges are of a form adapted to travel within the groove 16 of the bed plate 12. As clearly indicated in Fig. 9 the links 21 and the connecting members 30 of the chain are fastened together by pins 31, which have a head 32 and comprise a thicker portion 33 and a reduced outer portion 34 forming thereby a shoulder 35. The pin 31 has a loose fit in the aperture 36 of the connecting members 30, but has a tight fit in the aperture 37 of the links 21.

As indicated in Fig. 11 the members 30 are wholly received within the groove 16, whereas the links 21 have their lower faces flush with the top surface of the bed plate 12. The inner run of the chain 10 will therefore abut with its members 21 against the guide bar 19, as previously stated, and this for the purpose of preventing lateral movement of the chain and thereby preclude improper location of the nut blanks during the slotting operation. In conjunction with the chain 10 a chute 38 is provided, shown in Figs. 1 and 2, which is secured to the die shoe 1 in any preferred or convenient manner, and which comprises a horizontal table 39 which opens at the right hand side, as viewed in Figs. 1 and 2, into a curved channel 40. As shown in Fig. 14, the channel 40 is formed by a rectangular curved member 41 provided with a recess 42 and which recess has its outer open side restricted by overhanging plates 43 secured to said member 41, so as to prevent nut blanks arranged on the table and sliding down within the recess from falling out or taking another than the predetermined curved path.

The nut blanks which emanate from the lower end of the shoe 40 singly enter the space 44 between adjacent links 21 of the chain, such that a flat face of the nut blank bears against the resilient gripper or holding disk 26. The disks being restrained from outward movement by the stop pin 28 will not force the nut blank outwardly, but on the other hand will permit an inward movement of the nut blanks whenever such movement of the nut blanks becomes necessary. The nut blanks having been received in the respective compartments 44 are intermittently carried by the chain 10 past the guide flange 20 to the stationary dies 8 and the punches 7 to be there castellated in a manner described in my copending application.

Attention is called to the fact that upon each step by step movement of the chain the nuts arranging themselves in a forward recessed portion of the stationary dies will be rotated about sixty degrees or indexed, so that upon reaching the next die another portion of the nut wall will be presented for operation to the punch. Partial rotation of the nut blank will of course necessitate an inward movement of the holding member 26, which movement is possible by the compression of the spring 27 as previously explained. The manner of indexing the nuts is described in my copending application and no further reference thereto is deemed necessary.

The means for actuating the chain intermittently are next to be considered. As shown in Fig. 2 the punch holder 5 is equipped with a bracket 45 to which a depending member 46 is secured having at the right hand side a cam edge 47. The die shoe 1 is formed at the right hand side as viewed in Figs. 1 and 5 with a raised portion 48 having a longitudinal groove 49 of considerable width to receive a carriage 50. The latter is adapted to slide to and fro in said recess and is equipped with upright standards 51 between which a roller 52 is journalled having its axle pin 53 journalled in said standards. The carriage 50 has a longitudinal slot 54 which registers with a similar slot in the die shoe, so that in the descent of the punch holder 5 the member 46 with its enlarged lower portion can move through the slot 54 and thus permit the carriage 50 to travel toward the left hand side, as viewed in Fig. 2, under the influence of two springs 55 which enter ports in the carriage 50 at one side and enter sleeves 56 secured to the flange 2 of the die shoe, there being openings in the flange 2 to permit the passage of the springs into the sleeves 56.

In order to prevent a vertical movement of the carriage, rails 57 are secured to the raised portion 48 of the die shoe and overhang lateral extensions 58 of the carriage, whereby the latter is prevented from executing a vertical, but is permitted to execute a horizontal reciprocal movement. After the punch block and the member 46 have completed the descending movement and the carriage 50 has travelled under the influence of the springs 55 toward the left hand side as the cam edge in engagement with the roller admits of such movement, the ascending movement of the punch block and of the member 46 will force the carriage again to the right hand side, and this by reason of the engagement of the cam edge 47 with the roller 52. As a consequence, the vertical reciprocatory movement of the punch block is transmitted to the carriage 50 and transformed into a horizontal reciprocatory movement of the latter. This reciprocatory movement of the carriage 50 is communicated to the chain to obtain an intermittent movement in one direction of the same. As shown in Fig. 1, the carriage 50 is provided at the inner end with a head 59 which has guide pins 60 (Fig. 5) extending therefrom and telescoping in bores provided in the carriage. On the other side of the member 59 spaced arms 61 constitute a bearing for a pin 62 to which a member 63 shown in Fig. 8 is secured. The member 63 comprises a long narrow bar having seven teeth 64 at the upper edge, which teeth have operating faces 65. The end portion of the bar 63 is enlarged as at 66 and is provided with a vertical slot 67 through which the pin 62 extends when the bar is mounted on the member 59.

Referring to Figs. 3, 4 and 11, it will be seen that the bed plate 12 for the chain at the inner side is equipped with a leaf spring 68 which encompasses a pin 69 projecting from the bed plate. This leaf spring 68 serves to maintain the bar 63 (Fig. 11) in a position in which the operating faces 65 of the teeth 64 engage the slanting wall 29' of the recess 29 of the chain members 23.

From the foregoing it is obvious that when the punch lock descends and the carriage moves toward the left hand side, as viewed in Fig. 2, the teeth 64 on the bar 63 being resiliently held in position by the spring 68 merely ratchet over the recess portion 29 of the chain links, but when the punch block moves upwardly and the carriage is forced toward the right hand side then the operating faces 65 of the teeth enter into engagement with the walls 29' of the undercut recesses of the chain members which are located adjacent to the stationary dies, and in such upward movement the chain is moved a certain distance. Thus it will be seen that during each upward movement of the punch block the chain is advanced one step and this intermittent movement of the chain will of course ensure a successive advance of the nut blanks received between the chain links, the whole being timed so that a nut blank at the end of a partial movement of the chain is in proper position in the stationary die to be castellated.

In order to prevent actuation of the chain when several nuts should enter a compartment 44 or when jamming by virtue of the improper entering of the nut within such compartment should occur, a safety device is provided which permits a separation of the carriage from the member 59 such as indicated in Fig. 5.

As shown in Figs. 5, 12 and 13, one of the rods 16 telescoping in bores of the carriage 50 is provided with a cut out portion 70. The carriage 50 near its inner end carries a sleeve 71 in vertical position, which at the upper open end is closed by a screw plug 72. A pin 73 under the influence of a spring 74 is held in engagement with the rod 60, such pin being formed with a lower bevelled edge 75 adapted to conform to the recess portion 70 of the rod 60. It is obvious that the locking pin 73 will normally enter into the recess 70 and will only leave such engagement when an excessive pressure is exerted by the rod 60 in longitudinal direction toward the right hand side, as viewed in Fig. 13, the engaging surfaces of the locking pin 73 and the recess portion 70 being constructed with a view of permitting the retraction of the pin under pressure. From the foregoing it will be understood that when the member 59 is in engagement with the inner end of the carriage 50, the recess portion is in alignment with the vertical axis of the pin 73, so that the pin and the rod 60 will be in the position indicated in Fig. 13.

The operation of the machine is thought to be clear from the preceding description. The descent of the punch block upon the downward movement of the press will force the carriage toward the left hand side under the action of the springs 55 and this left hand movement of the carriage which is participated in by the toothed bar 63 at the end of the left hand movement would ensure the engagement of the teeth 64 of said bar with seven arms 23 of links 21. In the upward movement of the punch block the carriage is forced to the right hand side and the bar 63 being in engagement with seven of the chain links will force the chain to execute a movement corresponding to the horizontal stroke of the carriage. If however by chance several nut blanks will enter in one compartment 44 or for any other reason jamming occurs whereby a movement of the chain would cause links thereof to be broken, especially the arms 23 thereof, the safety device enters into operation to permit the carriage 50 upon executing the right hand movement to separate from the member 59 so that the reciprocations of the carriage in both directions are idle and no movement is imparted to the chain. Thus, as soon as an excessive pressure is exerted upon the pin 73 the same will be lifted out of its engagement with the recess 70 so that the pin 73 will ride on the top surface of the rod 60 and will not interlock any more the carriage and the other parts whereby actuation of the chain is obtained.

In the drawings a preferred embodiment of the invention is shown which however is merely indicative of the principles on which the invention is predicated. Various changes of parts and modifications may be made within the scope of the invention, and such departures are included within the purview of the invention as defined by the following claims.

I claim:

1. In a machine of the class described, a stationary die, a reciprocating arrangement coacting with said die for slotting nut blanks, an endless chain comprising links and connecting members, said links being spaced to form compartments for the reception of nut blanks and adapted to convey the nut blanks through a path assigned thereto.

2. In a machine of the class described, a stationary die, a reciprocating arrangement coacting with said die for slotting nut blanks, an endless chain movable in a horizontal plane and comprising links and connecting members, said links being spaced to form compartments for the reception of nut blanks and adapted to convey the nut blanks through a path defined by said die and said chain, and means for holding said nut blanks in proper position within the said compartments.

3. In a machine of the class described, a stationary die, a reciprocating arrangement coacting with said die for slotting nut blanks, an endless chain comprising links having outwardly extending arms, members connecting said links, said arms of adjacent links forming a space for the reception of nut blanks and adapted to convey the same through a path defined by said chain and die, and means for holding said nut blanks in proper position within said compartments.

4. In a machine of the class described, a stationary die, a reciprocating arrangement coacting with said die for slotting nut blanks, an endless chain comprising links and members pivotally connecting said links, each link having an arm at one end thereof extending outwardly therefrom, the arms of adjacent links defining a space for receiving a nut blank and adapted to convey the nut blanks through a path defined by said die and said chain, and resilient means for holding said nut blank in proper position within said space.

5. In a machine of the class described, a stationary die, a reciprocating arrangement coacting with said die for slotting nut blanks, an endless chain comprising links and members pivotally connecting said links, each link having an arm at one end thereof extending outwardly therefrom, the arms of adjacent links defining a space for receiving a nut blank and adapted to convey the nut blanks through a path defined by said die and said chain, and spring controlled means for holding said nut blank in proper position within said space.

6. In a machine of the class described, a stationary die, a reciprocating arrangement coacting with said die for slotting nut blanks, an endless chain comprising links and connecting members, said links being constructed to form with adjacent links compartments for the reception of nut blanks and adapted to convey the nut blanks through a path defined by said die and said chain, the inner run of said chain constituting one side of the path.

7. In a machine of the class described, a stationary die, a reciprocating arrangement coacting with said die for slotting nut blanks, an endless chain comprising links and connecting members, said links being constructed to form with adjacent links compartments for the reception of nut blanks and adapted to convey the nut blanks through a path assigned thereto, the inner run of said chain constituting with said die the path through which the nut blanks are conveyed.

8. In a machine of the class described, a stationary die, a reciprocating arrangement coacting with said die for slotting nut blanks, an endless chain movable in a horizontal plane, and comprising links and connecting members, said links being spaced to form compartments for the reception of nut blanks and adapted to convey the nut blanks through a path defined by said die and said chain, and disks telescoping in bores provided in said links to constitute abutments against which the nut blanks bear during conveyance.

9. In a machine of the class described, a stationary die, a reciprocating arrangement coacting with said die for slotting nut blanks, an endless chain movable in a horizontal plane, and comprising links and connecting members, said links being spaced to form compartments with adjacent links for the reception of nut blanks and adapted to convey the nut blanks through a path defined by said die and said chain, disks adapted to telescope in bores provided in said links to constitute abutments against which the nut blanks bear during conveyance, resilient means opposing telescoping movement of said disks, and means for limiting outward movement of said disks.

10. In a machine of the class described, a stationary die, a reciprocating arrangement coacting with said die for slotting nut blanks, an endless chain movable in a horizontal plane, and comprising links and connecting members, said links being spaced to form compartments with adjacent links for the reception of nut blanks and adapted to convey the nut blanks through a path defined by said die and said chain, disks disposed in the compartments and adapted to telescope in bores provided in said links to constitute abutments against which the nut blanks bear during conveyance, springs opposing telescoping movement of said disks, and a stop pin limiting outward movement of said disks.

11. In a machine of the class described, a stationary die, a reciprocating arrangement coacting with said die for slotting nut blanks, an endless chain adapted to convey nut blanks through a path defined by said die and said chain, and means for positively guiding said chain to preclude irregular movement thereof.

12. In a machine of the class described, a die shoe, a bed plate secured to said die shoe and having an endless recess therein, an endless chain adapted to travel in said recess and to convey nut blanks.

13. In a machine of the class described, a die shoe, a bed plate secured to said die shoe and having an endless recess therein, an endless chain adapted to travel in said recess, said chain comprising links and connecting members, said links being spaced to form with adjacent links compartments for the reception of nut blanks and adapted to convey the same, said members being arranged underneath said links and traveling in said recess to prevent lateral movement of the chain runs.

14. In a machine of the class described, a die shoe, a bed plate secured to said die shoe and having an endless groove therein forming straight parallel paths interconnected by arcuate portions, an endless chain adapted to travel in said groove, said chain comprising links and connecting members, said links being spaced to form with adjacent links compartments for the reception of nut blanks and adapted to convey the same, said members being arranged underneath said links and being received within said groove for travel therein, said links being arranged with the lower face flush with the upper surface of said bed plate.

15. In a machine of the class described, a die shoe, a bed plate secured to said die shoe and having an endless groove therein forming straight parallel paths interconnected by arcuate portions, an endless chain adapted to travel in said groove, said chain comprising links and connecting members, said links being spaced to form with adjacent links compartments for the reception of nut blanks and adapted to convey the same, said members being arranged underneath said links and being received within said groove for travel therein, said links being arranged with the lower face flush with the upper surface of said bed plate, and a chute secured to said die shoe in position to deliver by gravity nut blanks into said compartments, substantially as described.

16. In a machine of the class described, a punch, endless means for conveying nut blanks through a path assigned thereto, and punch operated means for imparting an intermittent movement to said endless means.

17. In a machine of the class described, a vertically reciprocating punch, a carriage horizontally reciprocated by said punch, endless means for conveying nut blanks through a path assigned thereto, and means for transmitting a step by step movement from said carriage to said endless means.

18. In a machine of the class described, a vertically reciprocating punch, a carriage horizontally reciprocated by said punch, an endless chain adapted to intermittently convey nut blanks, and means for actuating said chain on the reciprocating of said carriage.

19. In a machine of the class described, a vertically reciprocating punch, a carriage horizontally reciprocated by said punch, an endless chain adapted to intermittently convey nut blanks and means secured to said carriage and engaging a plurality of chain links to impart intermittent movements to said chain.

20. In a machine of the class described, a vertically reciprocating punch, a carriage horizontally reciprocated by said punch, an endless chain comprising links with outwardly extending arms and members interconnecting said links, said arms being formed on the underside with undercut grooves, and means secured to said carriage and adapted to engage the undercut grooves of a plurality of chain links to impart a step by step movement to said chain on the reciprocation of said carriage.

21. In a machine of the class described, a die shoe, a vertically reciprocating punch, a carriage horizontally reciprocating on said die shoe and having an endless groove, an endless chain adapted to travel in said groove and comprising links with outwardly extending arms and members interconnecting said links, said arms being formed on the under side with undercut grooves, means secured to said carriage and adapted to engage the undercut grooves of a plurality of chain links to impart a step by step movement to said chain on the reciprocation of said carriage, and means for maintaining said first named means in engagement with said chain links.

22. In a machine of the class described, a die shoe, a vertically reciprocating punch, a carriage horizontally reciprocating on said die shoe and having an endless groove, an endless chain adapted to travel in said groove and comprising links with outwardly extending arms and members interconnecting said links, said arms being formed on the underside with undercut grooves, means secured to said carriage and adapted to engage the undercut grooves of a plurality of chain links to impart a step by step movement to said chain on the reciprocation of said carriage, and resilient means for maintaining said first named means in engagement with said chain links.

23. In a machine of the class described, a die shoe, a vertically reciprocating punch, a carriage horizontally reciprocating on said die shoe and having an endless groove, an endless chain adapted to travel in said groove and comprising links with outwardly extending arms and members interconnecting said links, said arms being formed on the underside with undercut grooves, means secured to said carriage and adapted to engage the undercut grooves of a plurality of chain links to impart a step by step movement to said chain on the reciprocation of said carriage, and a leaf spring secured to said bed plate and adapted to maintain said first named means in engagement with said chain links.

24. In a machine of the class described, a die shoe, a vertically reciprocating punch, a carriage horizontally reciprocating on said die shoe, a bed plate secured to said die shoe and having an endless groove, an endless chain adapted to travel in said groove and comprising links with outwardly extending arms between which nut blanks are received for conveyance, and members interconnecting said links, said arms being formed on the underside with undercut grooves, and a ratchet bar pivotally secured to said carriage and adapted to engage the undercut groove of a plurality of chain links to impart a step by step movement to said chain on the reciprocation of said carriage.

25. In a machine of the class described, a die shoe, a vertically reciprocating punch, a carriage horizontally reciprocating on said die shoe, a bed plate secured to said die shoe and having an endless groove, an endless chain adapted to travel in said groove and comprising links with outwardly extending arms between which nut blanks are received for conveyance, and members interconnecting said links, said arms being formed on the underside with undercut grooves, and a ratchet bar pivotally secured to said carriage and adapted to engage the undercut groove of a plurality of chain links to impart a step by step movement to said chain on the reciprocation of said carriage, and a leaf spring secured to said bed plate and bearing against the ratchet bar to maintain the same in engagement with said chain links.

26. In a machine of the class described, a vertically reciprocating punch, a carriage horizontally reciprocated by said punch, an endless chain adapted to intermittently convey nut blanks, and means secured to said carriage and releasable upon jamming of nut blanks for engaging a plurality of chain links to impart intermittent movement to said chain.

27. In a machine of the class described, a vertically reciprocating punch, a carriage horizontally reciprocated by said punch, an endless chain provided with compartments and adapted to intermittently convey nut blanks, and means secured to said carriage and automatically releasable upon improper arrangement of nut blanks in said compartments for engaging a plurality of chain links to impart intermittent movement to said chain.

28. In a machine of the class described, a vertically reciprocating punch, a carriage horizontally reciprocated by said punch, an endless chain provided with compartments and adapted to intermittently convey nut blanks, a head releasably secured to said carriage, means secured to said head and adapted to engage a plurality of chain links to impart intermittent movement to said chain, and means for automatically releasing said head from said carriage upon improper arrangement of nut blanks in said compartments.

29. In a machine of the class described, a vertically reciprocating punch, a carriage horizontally reciprocated by said punch, an endless chain provided with compartments and adapted to intermittently convey nut blanks, a head having pins extending into bores provided in said carriage, a locking pin extending through said carriage and entering a recess in one of said pins, a ratchet bar secured to said head and adapted to impart movement to said chain on the reciprocation of said punch, and means for permitting withdrawal of said locking pin and thereby release said head from said carriage upon the pull exceeding a predetermined amount.

30. In a machine of the class described, a vertically reciprocating punch, a carriage horizontally reciprocated by said punch, an endless chain provided with compartments and adapted to intermittently convey nut blanks, a head having pins extending into bores provided in said carriage, a locking pin extending through said carriage and catering with a beveled end a recess in one of said pins, a ratchet bar secured to said head and adapted to impart movement to said chain on the reciprocation of said punch, and a spring for maintaining said locking pin in functional position.

31. In a machine of the class described, a die shoe, a vertically reciprocating punch, a carriage horizontally reciprocating on said die shoe, a bed plate secured to said die shoe and having an endless groove, an endless chain adapted to travel in said groove and comprising links with outwardly extending arms between which nut blanks are received for conveyance, and members interconnecting said links, said arms being formed on the underside with undercut grooves, a head having pins extending into bores provided in said carriage, a locking pin extending through said carriage and entering with a beveled end a recess in one of said pins, a ratchet bar secured to said head and adapted to engage the undercut grooves of a plurality of chain links to impart a step by step movement to said chain, and a spring for maintaining said locking pin in functional position.

32. In a machine of the class described, a die shoe, a vertically reciprocating punch, a carriage horizontally reciprocating on said die shoe, a bed plate secured to said die shoe and having an endless groove, an endless chain adapted to travel in said groove and comprising links with outwardly extending arms between which nut blanks are received for conveyance, and members interconnecting said links, said arms being formed on the underside with undercut grooves, a head having pins extending into bores provided in said carriage, a locking pin extending through said carriage and entering with a beveled end a recess in one of said pins, a ratchet bar pivotally secured to said head and adapted to engage the undercut grooves of a plurality of chain links to impart a step by step movement to said chain, and a spring for maintaining said ratchet bar in engagement with said chain links.

In witness whereof I affix my signature.

WALTER UMBDENSTOCK.